Nov. 24, 1970    A. Y. BAKER, JR    3,541,699
TEACHING SYSTEM AND MACHINE
Filed June 6, 1968    3 Sheets-Sheet 1
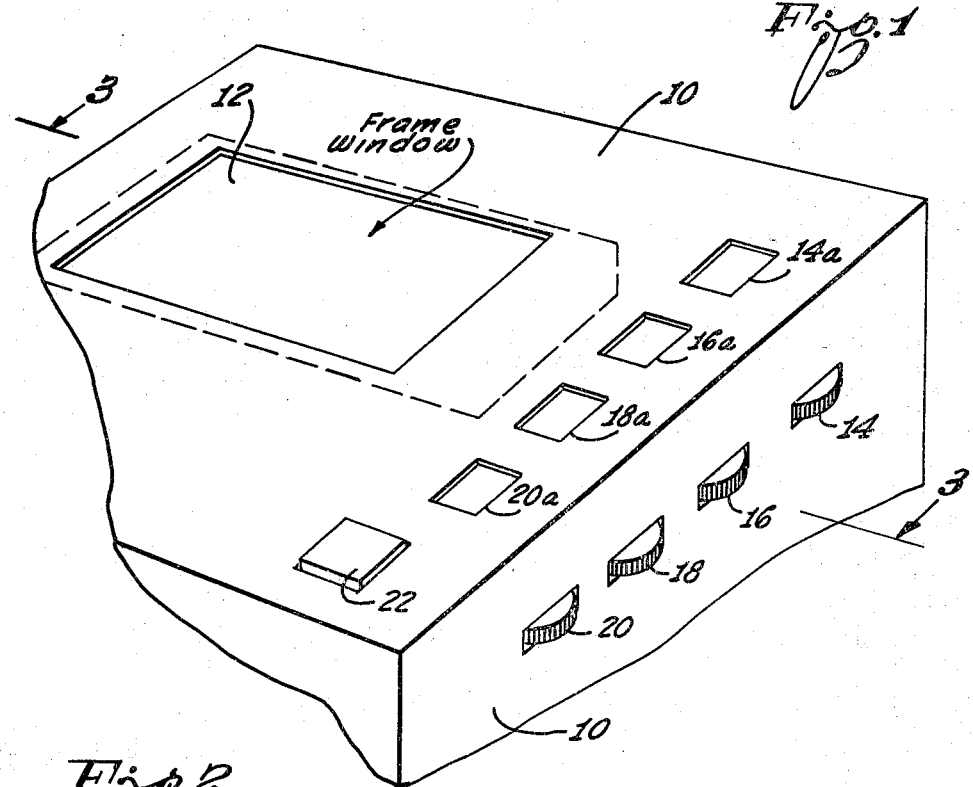
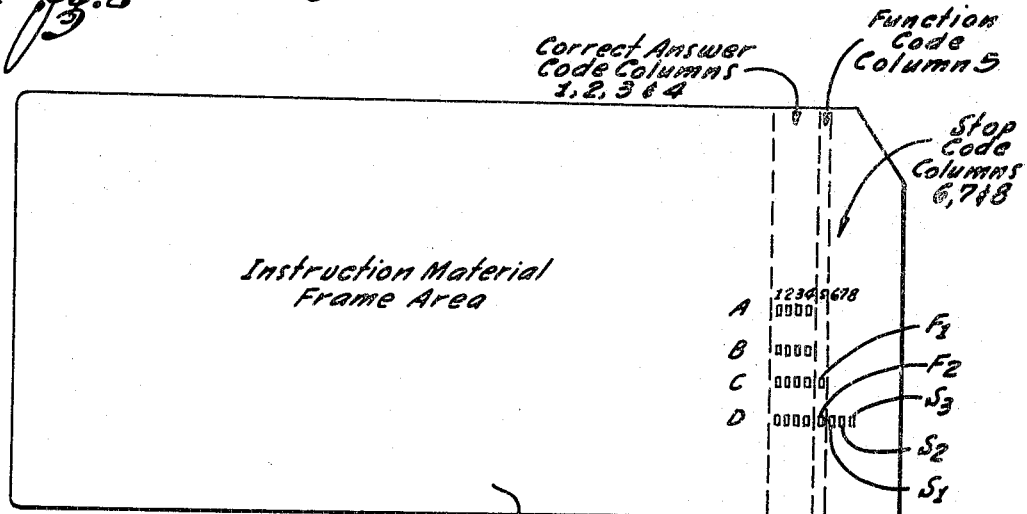
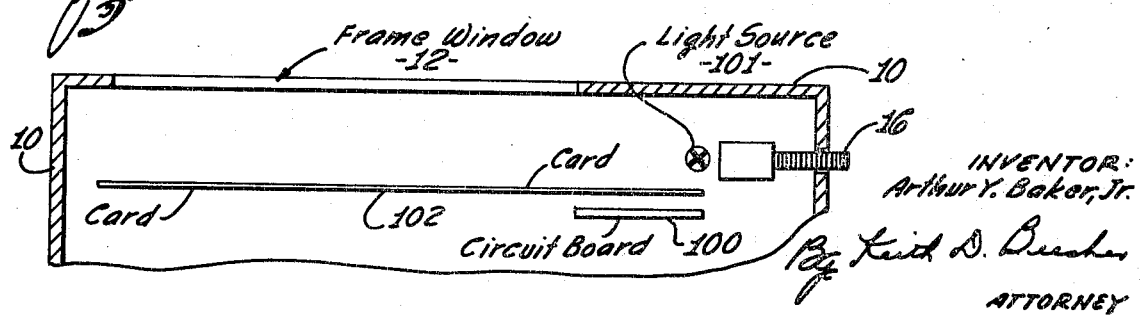
INVENTOR:
Arthur Y. Baker, Jr.
By Keith D. Beecher
ATTORNEY

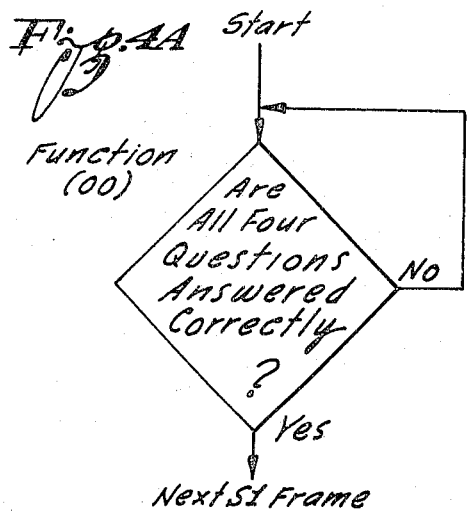
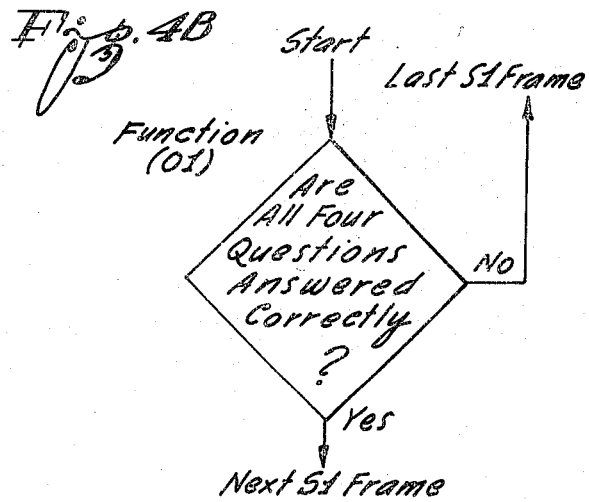
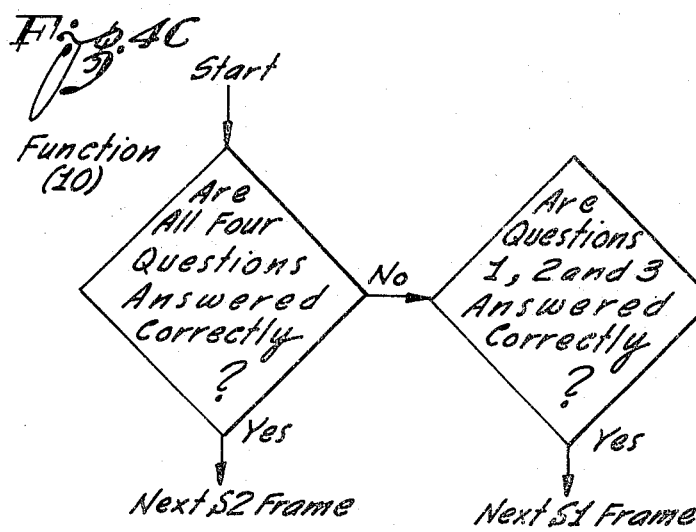
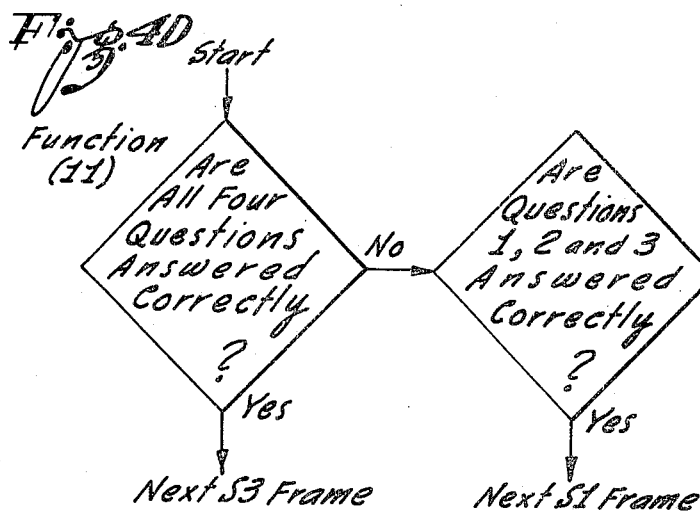

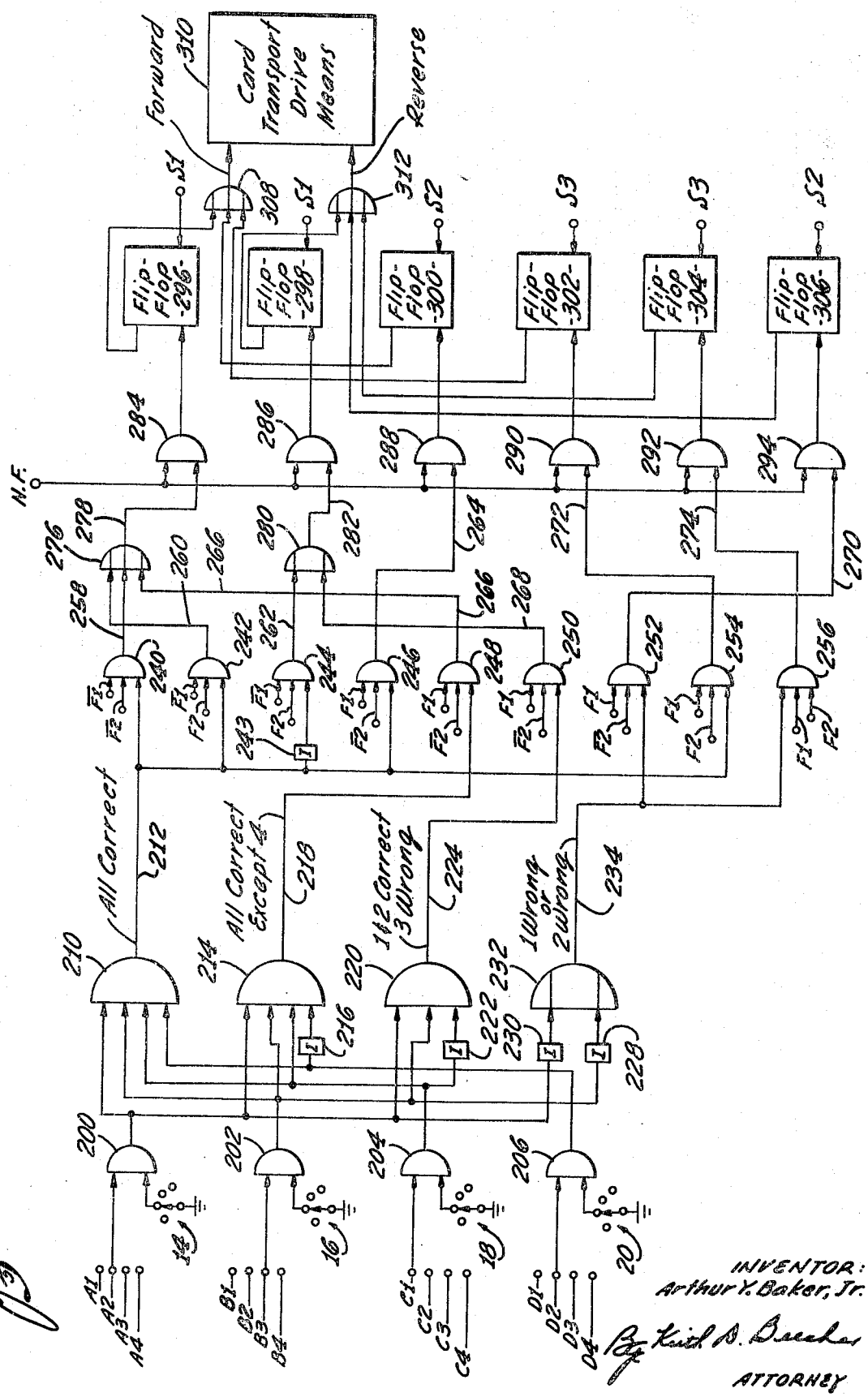

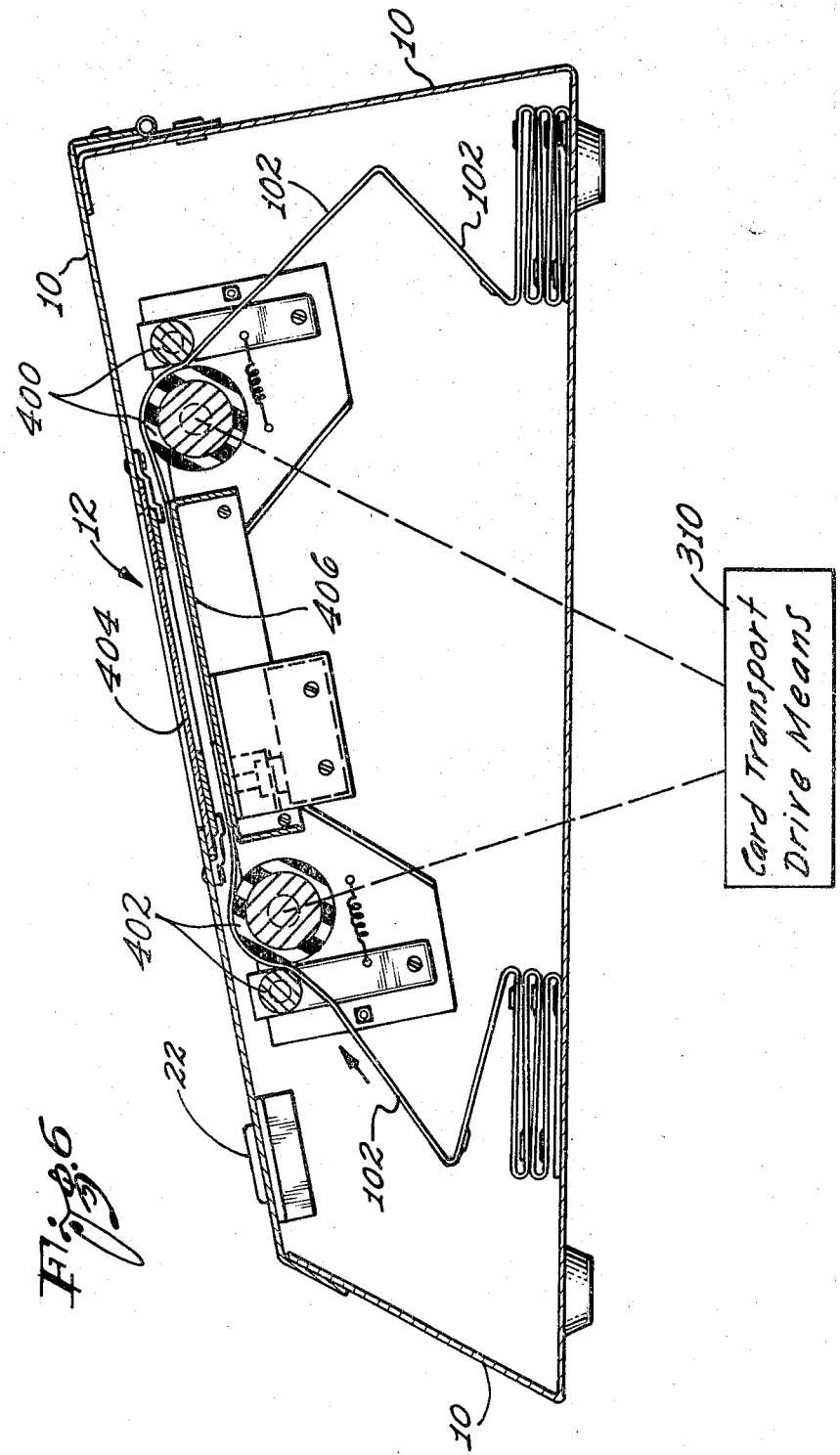

United States Patent Office 3,541,699
Patented Nov. 24, 1970

3,541,699
TEACHING SYSTEM AND MACHINE
Arthur Y. Baker, Jr., 3818 Havenhurst Ave.,
Encino, Calif. 91316
Filed June 6, 1968, Ser. No. 734,914
Int. Cl. G09b 7/08
U.S. Cl. 35—9                                    4 Claims

ABSTRACT OF THE DISCLOSURE

An improved teaching system and machine is described in the following specification which uses, for example, a deck of cards presenting a selected topic. The cards are presented on a one-by-one basis to the student by the machine, and the machine is programmed to control the sequence in which the cards are presented to the student in dependence upon the answers given by the student to the questions and problems presented by the cards. In this manner, a dialogue is created between the student and the machine, which can be brought to a conclusion only when the machine is satisfied that the student has mastered the particular topic.

BACKGROUND OF THE INVENTION

Teaching machines are now well established as an effective aid to self-instruction. Many such machines have been devised in the past ranging from the simple to the highly complex. In most teaching machines, the problems and questions are presented to the student in graphic form, and the student answers the questions by actuating one of several selector switches, on a multiple choice basis. Then, if the answer is correct, the machine responds accordingly, such as by causing the next frame of information and problems to be presented. However, if the answer is incorrect, the machine may respond by regressing to another frame of supplemental information.

For example, card type mechanical teaching machines are known which present a sequence of questions and problems to the student by means of a series of cards. Such machines are capable of responding in a variety of ways to the answers given by the student to the various questions. For example, there are at present machines which present problems to the student by sequentially revealing the cards on a one-by-one basis, and by which the student indicates his answer by pressing one of a group of buttons. The machine then indicates by one means or another whether the button pressed by the student corresponds, or does not correspond, to the correct answer of the displayed problem.

The system of the present invention is one which may be practiced by a machine, such as described above, in which a series of cards are presented on a one-by-one basis to the student, and by which the student indicates his answer to the questions propounded by the machines by pressing appropriate buttons selected by him from a group of like buttons. The machine then responds to the selected button in different ways, depending upon whether or not the answer is correct.

The material to be studied and answered is inscribed, for example, on standard punched cards, or on other appropriate media, and these are transported by the machine to be individually visible through a window in the casing of the machine. A part of each card, however, is not visible through the window, and this latter part contains a pattern of punched holes, or other indicia. These holes are sensed by the control system of the apparatus, and the cards are thereby controlled in any of several ways, depending upon the response given by the student.

The system of the invention is flexible in that substantially all types of presently known programmed teaching material can be utilized in the apparatus. For example, apparatus embodying the invention may be constructed to handle the constructed response type of learning material; as well as the multiple choice, branching, straight testing, and other types. The apparatus embodying the invention responds to the aforesaid hole pattern in the program section of each card to determine the control to be exerted on the cards, so that any combination of programming methods can be worked out for a single deck.

The housing of the apparatus of the invention may be locked so as to render the cards contained in the housing physically inaccessible to the student operating the mechanism. The mechanism can then be programmed to move the cards in the deck forward or backward, as the answers are given by the operating student are correct or incorrect. The programming may be such that the student cannot cause the machine to progress through the entire deck of cards until he has completely mastered the subject matter of the cards to the satisfaction of the machine. In practice, the possible answers to each problem and the number of problems for each card are made sufficiently numerous, so as to render it practically impossible for the student to run a deck of cards through the machine successfully on pure guesswork.

Therefore, although the wide flexibility of the machine of the invention renders it capable of being programmed to respond to correct and incorrect answers in a wide variety of ways, the machine in one of its aspects can be programmed so that progress by the student through a deck of cards locked in the machine is dependent upon his answers. Therefore, no supervision is required, and the mere fact that the student has guided the machine through the deck of cards is sufficient, in and of itself, to show a mastery by the student of the selected subject matter of the particular deck of cards.

As will be described, the control section of each card may be punched in accordance with a predetermined "function code," so that different opeartions, such as "advance to next card" or "return to last card" etc., may be initiated when the student presses an "advance" button on the machine, and depending upon whether or not the questions have been properly answered.

In the mechanism to be described, for example, each card presents four separate problems, and each problem has four alternatives in selecting the proper response. In addition, the flexibility provided by the function code permits different card shifts, forward or backward to be made, depending upon the number of correct answers given for each card. The variables are too numerous for any progress to be made through a deck of cards on chance alone; and, as mentioned above, any student capable of controlling the machine so that the entire deck is processed thereby, must actually know the subject matter presented by the cards.

BRIEF DESCRIPTION OF THE DRAWINGS

FIG. 1 is a perspective view showing appropriate apparatus incorporating the concepts of the present invention;

FIG. 2 shows a typical card which may be used in the practice of the present invention;

FIG. 3 is a section through the machine of FIG. 1, and showing certain internal components of the machine;

FIGS. 4A–4D are flow charts showing one possible operation of the machine;

FIG. 5 is a circuit diagram of a control system which may be included in the machine; and FIG. 6 is a section through the housing of the apparatus of FIG. 1, and shows a typical card transport mechanism which may be used within the housing.

DETAILED DESCRIPTION OF THE ILLUSTRATED EMBODIMENT

The machine to be described includes any appropriate known type of card transport mechanism and a solid state electronic control system housed, for example, in an enclosure 10 shown in FIG. 1. The enclosure 10 may be relatively small and the mechanism may be light in weight, so that the machine is readily portable.

Programmed material, printed on standard punched cards (such as shown in FIG. 2), for example, may be observed through a frame window 12 in the top of the enclosure 10. The right-hand section of the card positioned under the window 12 is not visible through the window, and this latter section contains a pattern of punched holes. These punched holes are sensed by the control system of the invention, as will be described, to cause the mechanism to respond in one of several ways, depending on the hole configuration and the student's response.

The student responds to each problem on the displayed card by moving each of a plurality of individual selector switches 14, 16, 18, 20 to a particular setting. These switches may be usual 4-position rotary switches, for example, and each has an indicator portion visible through corresponding answer windows 14a, 16a, 18a and 20a in the top of the enclosure 10. For example, each of the switches 14, 16, 18 and 20 may include indicia a, b, c, and d which are selectively visible through the corresponding answer window, as the switch is moved to the various positions by the student. After the student has selected his answers, he pushes a push-button entitled "Next Frame" the pushbutton being indicated as 22, as being positioned at the top of the enclosure.

In the example under consideration, there are four separate problems revealed by the subject matter on the card being processed, and these are visible to the student through the frame window 12. The student then responds to each of the four problems by appropriately adjusting the corresponding one of the answer selector switches 14, 16, 18 and 20. It will be appreciated that in the typical example, there are four possible responses to each of the four problems displayed by the card through the frame window 12. The apparatus may be programmed in a variety of ways, so that a particular control effect is generated when the "Next Frame" push-button 22 is depressed depending upon the settings of the various answer selector switches by the student.

A unique feature of the instrument, as mentioned above, is that the various types of programmed learning material in use today may be presented by the apparatus and controlled. These include, for example, but without being limited thereto, the constructed response type (Skinner method), the multiple choice type, the multiple-choice type, branching, straight testing, and so on. Because the apparatus responds in accordance with the pattern of holes in the program card being revealed, the system can utilize any combination of programming methods throughout the card deck of a particular group of cards.

As mentioned above, the enclosure 10 may provide a locked storage for the cards. Then, the transport of the cards through the deck locked within the enclosure 10 depends upon the answers given by the student, as he manipulates the answer selector switches for each card. Due to the wide range of variables, it is not possible for a student to manipulate the apparatus successfully through a deck of properly programmed cards, unless he is fully acquainted with the subject matter presented by the cards.

The electronic control system for the apparatus is mounted, for example, on a printed circuit board 100 (FIG. 3) which is positioned within the enclosure 10 directly under the punched hole program portion of the card, designated 102, as that card is positioned by the machine transport for viewing through the frame window 12. A group of light sensors on the circuit board, as will be described, are arranged in a pattern similar to the hole patterns punched in the program cards, as shown, for example, in FIG. 2. If a particular hole is punched in the program card, light from a source 101 will pass through the card and activate the corresponding light sensor. An appropriate light baffle is placed between the light sensors and the program card so as to ensure that light passing through any particular hole in the card will activate only one corresponding sensor.

The holes which are punched in the right hand section of each card 120 are grouped in various columns. Columns 1–4 in FIG. 2 are the "Correct Answer Code," whereas, column 5 is the "Function Code" column, and columns 6, 7 and 8 are the "Stop Code" columns.

It will be observed in the card of FIG. 2, that punches are provided in the Correct Answer Columns 1, 2, 3 and 4, at the various rows A, B, C and D. The rows correspond to the different problems on the card 102. For any particular problem in which there is but one correct answer, for example, to problem A, a hole is punched only in column 2, so that the student must activate the sensor corresponding to that hole in order for a correct answer to be recorded by turning the selector switch 16, for example, to "2." In any situation in which, for example, there are less than four separate problems, all the holes in columns 1–4 corresponding to the remaining rows are punched, so that a "correct" answer is automatically given for the missing problems, regardless of the setting of the answer selector switches.

The Function Code holes of column 5 are used to cause the control circuitry to activate the card transport mechanism, and thereby move the cards, for example, in the forward or reverse direction, depending upon the answers provided by the student in setting the answer selection switches. For example, punches in the Function Code column 5 may provide that if a particular answer is given, the card transport mechanism is activated in reverse to move the cards back to a previous card. In any event, the movement of the cards by the card transport mechanism continues until a punch is encountered in the Stop Code columns 6, 7 and 8 of a subsequent card.

The holes in the Function Code column are designated $F_1$ and $F_2$ in the particular example of FIG. 2 and the particular card in FIG. 2 is also shown as having three Stop Code holes S1, S2 and S3 in the D row. The control circuitry, as will be described, responds to the S1, S2 or S3 holes to stop or start the drive motor for the card transport mechanism.

The use of standard punched cards, such as shown by the card 102 in FIG. 2, provides a convenient and economical means of presenting the instructional material. Card stock is inexpensive and readily available. Moreover, punched cards may be duplicated automatically by the use of known types of duplicating punch machines. Experimental programs and drafts of programs can be typed on the individual cards, written or pasted on the cards. Commercially available key punch machines may be used to punch the desired program holes in the cards.

About ¾ of the card 102 is available for the instructional materials and is visible through the frame window 12. The remaining ¼ of the card contains the Answer Codes (columns 1–4). Function Code (column 5), and Stop Codes (columns 6, 7 and 8), which do not appear through the window.

Because of the unique control circuitry, the programmer may use any programming method appropriate to the material. As a matter of fact, any combination of methods may be used because each program card specifies how the apparatus of the invention will react to the student's response.

The control circuitry on the circuit board 100, for example, obtains its instructions from the Function Code punched in the C and D row positions of column 5 in FIG. 2, designated $F_1$ and $F_2$, respectively. There are four possible function codes in the particular embodiment, these being, for example, (00), (01), (10) and (11), or, expressed logically, $(\overline{F_1 F_2})$, $(\overline{F_1} F_2)$, $(F_1 \overline{F_2})$, and $(F_1 F_2)$. A "0" or $\overline{F_1}$, $\overline{F_2}$ for example, means that a hole is not punched, and a "1" or $F_1$, $F_2$ indicates that a hole is punched, in the particular illustrated example.

A series of flow charts showing the basic conditions for each function code are shown graphically in FIGS. 4A–4D. A brief description of each function code in a particular example, and some of the possible variations will now be described. It should be remembered that each card carries its own function code, and that each card is independent of any other card in the deck except for the indication as to which card will be used next.

Function code (00) (FIG. 4A).—If all four questions have been answered correctly, the next program card that has an S1 stop code punched will appear, when the "Next Frame" push button 22 is depressed. If all four questions are not answered correctly, the current card will remain under the window. It is important to note that the S1 code does not necessarily have to be punched in the next card. The (00) code is similar to the (01) code except that the reverse function has been inhibited, all of the variations of the (01) code apply.

Function code (01) (FIG. 4B).—The (01) code will cause the next S1 card to appear if all four questions have been answered correctly, and the previous S1 card to appear if all four questions were not answered correctly. It might be pointed out that more than one correct answer to a question can be specified by punching holes in more than one column corresponding to the row representing the particular question. Less than four questions can be used, as noted previously herein, by punching all the answer holes for the unused questions. Unrestricted advance to the next S1 card can be provided by punching all sixteen answer holes. Unrestricted reverse to the last S1 card can be achieved by not punching any of the answer holes.

Function code (10) (FIG. 4C).—Function code (10) provides for a four-way branch as follows:

(a) If all four questions are answered correctly, the next S2 card will appear; if all questions are answered correctly except question 4, the next S1 card will appear; if questions 1 and 2 are answered correctly, and question 3 is not, the previous S1 card will appear; if either question 1 or 2 is answered incorrectly, the last S2 card will appear.

Function code (11) (FIG. 4D).—Function code (11) may be identical to (10) except that in the latter instance, if all four questions are answered correctly, the next S3 card will appear; and if either question 1 or 2 is answered incorrectly, the last S3 card will appear. Variations permissible with codes (10) and (11) are so extensive that no attempt will be made to described them except to note that a complex structure of branching or skipping and sub-branching or sub-skipping both forward and back can readily be programmed.

The circuit board 100 of FIG. 3 may be wired in the manner shown in FIG. 5, for example, in order to carry out the various function codes described above. It will be understood, of course, that the circuit board may be wired in any other desired manner, so that other funtion codes may be implemented. In the logic diagram of FIG. 5, the various sensors on the circuit board are designated A1–A4 in correspondence with the first row of the card in FIG. 2 in the "correct answer code" columns. Likewise, the sensors designated B1–B4 correspond to the B row; and sensors indicated C1–C4 correspond to the C row; and the sensors D1–D4 correspond to the D row. The sensors may, for example, be in the form of photo-diodes, or the like, which complete a circuit upon the incidence of light thereon.

In FIG. 5, the sensor A2 is shown as connected to an "and" gate 200; the sensor B3 is shown as connected to an "and" gate 202; the sensor C1 is shown as connected to an "and" gate 204; and the sensor D2 is shown as connected to an "and" gate 206. Also connected to the "and" gate 200 is the corresponding terminal of the selector switch 14; connected to the "and" gate 202 is the corresponding terminal of the selector switch 16; connected to the "and" gate 204 is the corresponding terminal of the selector switch 18; and connected to the "and" gate 206 is the corresponding terminal of the selector switch 20.

It will be understood that the various sensors of each group are actually connected to different "and" gates, as are the corresponding terminals of the respective selector switches. The arrangement is such that whenever a particular sensor, such as A2, for example, is activated, the corresponding selector switch, such as the switch 14, must be at the proper setting, for the "and" gate 200, for example, to produce an output. This applies to the other "and" gates (not shown) associated with the other sensors A1, A3 and A4. In each instance, the selector 14 must be set to the proper terminal, corresponding to the activated sensor, in order for an output to be produced. This applies, likewise, to the sensor groups B1–B4, C1–C4 and D1–D4.

The outputs of the "and" gates 200, 202, 204, 206 are connected to an "and" gate 210, and the "and" gate 210 produces an output on the lead 212 when all four problems presented by the card 102, for example, are answered correctly. The "and" gates 200, 202, 204 and 206 are all connected to an "and" gate 214, with the gate 206 being connected thereto through an inverter 216, so that an output is produced on the lead 218 when all answers are correct, except for the answer to problem No. 4. Likewise, the "and" gates 200, 202 and 204 are connected to an "and" gate 220, with the gate 204 being connected thereto through an inverter 222, in a manner such that an output is produced on a lead 224 when problems Nos. 1 and 2 are answered properly, but problem No. 3 is wrong. In like manner, the "and" gates 200 and 202 are connected through inverters 228 and 230 to an "or" gate 232, so that an output is produced on a lead 234 when problems Nos. 1 and 2 are answered incorrectly.

The function code sensors F1 and F2 are connected to a series of "and" gates 240, 242, 244, 246, 248, 250, 252, 254 and 256 through respective inverters, so that the different "and" gates of the series are enabled during the various function codes described above. The lead 212 is connected to the "and" gates 240, 242, 246, 254 and through an inverter 243 to the "and" gate 244. The lead 218 is connected to the "and" gate 248. The lead 224 is connected to the "and" gate 250. The lead 254 is connected to the "and" gates 252 and 256. Therefore, an output is produced on a lead 258 during the function code (00), and when all answers are correct. Likewise, an output is produced on a lead 260 during the function code (01) when all answers are correct, and an output is produced on a lead 262 during function code (01) when all answers are incorrect.

Likewise, an output is produced on a lead 264 during function code (10) when all answers are correct, and an output is produced on a lead 266 during function code (10) when all answers are correct except No. 4. An output is produced on a lead 268 during function code (10) when answers 1 and 2 are correct and No. 3 is wrong; an output is produced on a lead 270 during function code (10) when answers 1 or 2 are wrong; an output is produced on a lead 272 during (11) when all answers are correct; and an output is produced on a lead 274 during (11) when answers 1 or 2 is wrong.

The leads 258, 260 and 266 are connected through an "or" gate 276 to produce an output on a lead 278 when all answers are correct during the 00 and 01 function codes, and when all answers except No. 4 are correct during the 10 function code. The leads 264 and 268 are connected to an "or" gate 280 to produce an output on a lead 282 when all answers are incorrect during 01 function code and when answers 1 and 2 are correct but 3 is wrong during the 10 function code.

The leads 278, 282, 264, 272, 274 and 270 are connected to respective "and" gates 284, 286, 288, 290, 292 and 294. The "Next Frame" push button switch 22 is also connected to the aforesaid "and" gates. The "and" gates are connected to the said input terminals of a corresponding series of flip-flops 296, 298, 300, 302, 304 and 306. The S1 stop sensors are connected to the reset input terminals of the flip-flops 296 and 298; the S2 sensors are connected to the reset input terminals of the flip-flops 302 and 306; and the S3 sensors are connected to the reset input terminals of the flip-flops 302 and 304.

The set output terminals of the flip-flops 296, 300 and 302 are connected to an "or" gate 308 which, in turn, is connected to the forward drive energizing input terminal of the card drive transport means 310. The set output terminals of the flip-flops 298, 304 and 306 are connected through an "or" gate 312 to the reverse energizing input terminal of the card transport drive means 310.

Therefore, when the "Next Frame" push button is depressed, and if all answers are correct during the 00 and 01 function codes; or if all answers except No. 4 are correct during the 10 function code, the flip-flop 296 is set, so that the card drive means is energized to move the cards past the frame window 12 of FIG. 3, until the next card having an S1 punch in the stop code column is reached. The resulting activation of the S1 sensor resets the flip-flop 296 to stop the card transport drive means 310, so that the card bearing the S1 stop code replaces the previous card 102 under the frame window 12 of FIG. 3.

Likewise, should the "Next Frame" push button be depressed during function code 01 for an incorrect answer; or during function code 10 during a condition where two problems are answered correctly and one incorrectly, the flip-flop 298 is set, which causes the card transport drive means to be driven in reverse, so that the cards are moved backward until the previous S1 card causes the sensor S1 to be activated, so as to reset the flip-flop 298. When the flip-flop 298 is reset, the card transport drive means 310 is stopped, so that the previous card replaces the card 102 in FIG. 3 under the frame window 12.

Likewise, when all answers are correct during the 10 function code, the flip-flop 300 is set, so that the card transport drive means 310 is energized to cause the card transport mechanism to move additional cards under the frame window 12 of FIG. 3 until a card is reached with an S2 punch in its stop code columns. This punch causes the S2 sensor to be activated, so as to reset the flip-flop 300, to cause the card transport drive means to be de-activated with the S2 card in place under the frame window 12 of FIG. 3.

During the function code 11, and if all answers are correct, the flip-flop 302 is set, so that the card transport drive means 310 causes the card transoprt mechanism to be driven in a forward direction, until an S3 card is reached, the latter causing the flip-flop 302 to be reset, so as to cause the drive means to stop the card transport.

When problem 1 or problem 2 are wrong during the 11 function code, the flip-flop 304 is set, so as to cause the cards to be moved by the card transport mechanism until the next S3 card appears under the frame window. At that time, the flip-flop 304 is reset. Likewise, if during the 10 function code, questions 1 or 2 are answered improperly, the flip-flop 306 is set, causing the card transport to move backward until the previous S2 card is reached, at which time the flip-flop 306 is reset.

It will be appreciated, therefore, that by selecting the desired logic and by placing materials on the various cards to correspond with the selected logic, a student may, through his answers, conduct a dialog with the machine, and the machine may present any series of problems or responses to the student, depending upon whether the student answers the questions correctly or incorrectly.

The apparatus of the invention may be constructed to move the cards successively under the window without stopping, so that the material on the card appears momentarily and then vanishes. This capability, for example, is an aid when the machine is used for reading or memory training, recognition, or other types of instruction. A counter may be added to the mechanism to provide a numerical evaluation of student performance. Depending upon the function code and its variations, the counter can accumulate the number of right or wrong responses.

The card transport mechanism may consist of a simple known type of friction drive driven by the drive such as shown in FIG. 6, and which is means 310 referred to in FIG. 5. The card transport mechanism shown in FIG. 6 is similar to the card transport illustrated in Screven Pat. 3,250,021. However, any other appropriate known type of card transport mechanism may be used. The cards are preferably joined together and stacked fanfold in the housing, as shown in FIG. 6. Mechanical guides 404, 406 position and keep the cards in proper alignment at all times. The cards 102 move across the frame viewing window 12 driven by the friction drive rollers 400, 402. In the normal forward moving opeartion, the cards are pulled from the fanfold stack by the friction drive rollers 400 and are moved across the frame window 12, as well as across the hole sensors, and are stacked up fanfold in the housing. During the reverse operation of the mechanism, the friction drive rollers 402 pull the cards back across the frame viewing window 12 and causes them to be restacked fanfold in their starting position.

It will be appreciated, of course, that while a particular type of system has been described herein, others can be used in carrying out the concepts of the invention. All systems and mechanisms which come within the spirit and scope of the invention are intended to be covered by the following claims.

What is claimed is:

1. A teaching machine for utilizing a deck of cards, each card having a first portion bearing inscribed problems, data, information and the like; and a second portion bearing programming indicia, said programming indicia on each card including an answering code indicating the correct answers to a problem on the card, a function code indicating the manner in which the cards are to be moved in response to correct and incorrect answers, and a stop code indicating the next card to be displayed by said display means under a predetermined setting of said function code; display means for representing the first portion of said card to a student; a plurality of selector switch means actuable by the student to respond to information on the cards; transport means for moving the cards on an individual basis to said display means; and a control system responsive to the programming indicia of the card being presented and to a corresnonding setting of said selector switch means and coupled to said transport means to control the manner in which subsequent cards are transported thereby to said display means, said control system including means responsive to said answer code and to said function code and to the setting of said selector switch means for controlling the movement of the cards to said display means in a forward or reverse direction by said transport means, and said control system further including means responsive to said function code and to said stop code for terminating the movement of cards past said display means by said transport means.

2. The teaching machine defined in claim 1 in which said control system includes logic circuitry mounted on a circuit board.

3. The teaching machine defined in claim 1 in which the programming indicia on each of said cards is in the form of selectively located punched holes.

4. The teaching machine defined in claim 3 and which includes light sensing means included in said control system, and a light source for activating said means through the punched holes in the aforesaid card.

References Cited

UNITED STATES PATENTS

| | | | |
|---|---|---|---|
| 2,944,734 | 7/1960 | Martin | 35—482.2 X |
| 2,965,975 | 12/1960 | Briggs | 35—9 |
| 3,187,442 | 6/1965 | Hertsche | 35—9 |
| 3,221,418 | 12/1965 | Hoernes et al. | 35—9 |
| 3,254,431 | 6/1966 | Baker | 35—9 |

WILLIAM H. GRIEB, Primary Examiner